United States Patent [19]
Kolb

[11] Patent Number: 5,794,043
[45] Date of Patent: Aug. 11, 1998

[54] METHOD FOR TESTING AT LEAST ONE CLASS OF AN OBJECT-ORIENTED PROGRAM ON A COMPUTER

[75] Inventor: Sebald Kolb, Ottobrunn, Germany

[73] Assignee: Siemens Aktiengesellschaft, Munich, Germany

[21] Appl. No.: 454,279

[22] PCT Filed: Dec. 8, 1993

[86] PCT No.: PCT/EP93/03450

§ 371 Date: Jun. 16, 1995

§ 102(e) Date: Jun. 16, 1995

[87] PCT Pub. No.: WO94/14117

PCT Pub. Date: Jun. 23, 1994

[30] Foreign Application Priority Data

Dec. 17, 1992 [EP] European Pat. Off. ............ 92121511

[51] Int. Cl.$^6$ .................................................. G06F 9/45
[52] U.S. Cl. .................................................. 395/704
[58] Field of Search .................................. 395/700, 704, 395/183.13, 183.14

[56] References Cited

U.S. PATENT DOCUMENTS

| | | | |
|---|---|---|---|
| 5,339,433 | 8/1994 | Frid-Nielsen | 395/700 |
| 5,418,964 | 5/1995 | Conner | 395/700 |
| 5,421,016 | 5/1995 | Conner | 395/700 |
| 5,432,903 | 7/1995 | Frid-Nielsem | 395/161 |
| 5,493,680 | 2/1996 | Danforth | 395/700 |
| 5,557,730 | 9/1996 | Frid-Nielsen | 395/159 |
| 5,652,835 | 7/1997 | Miller | 395/183.14 |

FOREIGN PATENT DOCUMENTS

WO 90/04829  3/1990  WIPO.

OTHER PUBLICATIONS

Fielder, S.P., "Object–oriented unit testing," Hewlett–Packard Journal, v40, n2, p. 69(6), Apr. 1989.

Rettig, M., "Testing made palatable," Comms. of the ACM, v34, n5, p. 25(5), May 1991.

Automatisierungstechnische Praxis—ATP, vol. 31, No. 1, Jan. 1989, G. Pauthner et al., "TBM, ein vollständig generierbares Software–Modultestbett", pp. 30–36.

Proceedings of the Conference on Software Maintenance, 27 Oct. 1988, Tomaz Dogsta et al., "CAMOTE—Computer Aided Module Testing and Design", pp. 404–408.

Proceedings of the 9th Digital Avionics Systems Conference, 18 Oct. 1990, Gary L. Dehlin, "Automating Test Driver Generation", pp. 107–110.

*Primary Examiner*—Emanuel Todd Voeltz
*Assistant Examiner*—Peter J. Corcoran, III
*Attorney, Agent, or Firm*—Hill & Simpson

[57] ABSTRACT

The method is for testing classes of an object oriented program available for the first time.

Classes are tested in that the tester interactively inputs test commands with which method calls are possible. The checking of the test results is likewise possible in interactive fashion.

The testability is achieved in that the required call parameters are calculated in advance for all methods allowed in the class and in that precautions are undertaken in the computer memory in order to store and modify the possible parameters.

The advantages are that testing can be interactively carried out and not that the test program must be corrected, translated and linked again after the test evaluation in a time-consuming fashion.

The method is advantageously utilized in the development of communications software.

8 Claims, 2 Drawing Sheets

Member 1)                                    *FIG. 2*

STAGENLS : GENERIC
SYNMODE ELEMMODE = ANY_ASSIGN;
MODULE CLASS
GRANT POP, TOP, ISEMPTY, PUSH PREFIXED STAGENLS;
STAGENLS : CONSTR(); END STAGENLS;

POP : PROC();
END POP;

TOP : PROC() RETURNS (ELEMMODE);
END TOP;

PUSH : PROC(EL ELEMMODE);
END PUSH;

ISEMPTY : PROC() RETURNS (BOOL);
END ISEMPTY;

SYNMODE STACKPTRMODE = REF STACKELMODE;
SYNMODE STACKELMODE = STRUCT(
    EL ELEMMODE,
    NEXT STACKPTRMODE);
DCL ANCHOR STACKPTRMODE;

END STAGENLS;

THE BODY OF STAGENLS IS NOT INPUT FOR THE
TEST FRAME GENERATOR!

Member 2)

STAINTLS : MODULE CLASS = STAGENLS;
ACT_GEN_PART
SYNMODE ELEMMODE = INT;
END STAINTLS;

Member 3)

STATEXLS : MODULE CLASS = STAGENLS
SEIZE TEXMODE;
ACT_GEN_PART
SYNMODE ELEMMODE = TEXMODE;
END STATEXLS;

METHOD FOR TESTING AT LEAST ONE CLASS OF AN OBJECT-ORIENTED PROGRAM ON A COMPUTER

BACKGROUND OF THE INVENTION

The contribution that the software supplies to the solution also increases with the increasing scope of system solutions within the framework of large-scale industrial projects. In order for one to be able to efficiently execute large software products, it has proven advantageous to subdivide these projects into sub-projects and to modularly produce individual programs. A not insignificant aspect in the modular production of programs is also that individual program modules can be easily re-exploited by other projects. In recent years, the technique of object-oriented programming has proven advantageous in this context.

In conjunction with the re-employability of individual program modules, it is especially the quality assurance of these program modules that acquires increased significance. The demands of an especially error-free quality of individual program structures are met by specially developed testing procedures. A significant concern of software testing is to document the quality of the software within the framework of the test coverage. The greatest variety of testing methods are conceivable for assisting the tester in his work. One attempts to make a continuous test of the software of individual program modules up through the complete system possible with these testing methods. In particular, one distinguishes between three tests building on one another: the component test, the integration test, and the system test. The component test has the goal of finding errors in the individual program component. The components, traditionally, are a matter of one or more modules, for example of classes in object-oriented programming. The component test is supplemented by the integration test, with whose assistance errors at the interfaces and in the communication between the tested components are discovered. Finally, a system test can be implemented, this representing a test from the viewpoint of the customer (for example the test of a complete switching-oriented system). The goal thereof is to test the stability of the entire (program) system under "load", i.e. real through extreme conditions.

Within the framework of the technique of object-oriented programming, the component test is presented by a testing method for classes. Meaningfully, one begins the test in individual program components, i.e. the classes. When one builds on untested classes in the test of a program, the errors that were made in the class implementation are not detected or are only detected with far greater difficulty and, correspondingly, are more difficult to eliminate. The reason for this in addition to the poor surveyability of the overall program lies in the mixing of these functional errors with those that occur in the interaction of the individual objects (communication or, respectively, interface errors). Another significant reason for well-tested classes is the enhanced readiness resulting therefrom of being able to reemploy these classes. Qualitatively poor software is obviously not suitable for reemployment.

As a rule, classes as test subjects are not capable of being run by themselves and can thus not be debugged with a debugger of an operating system without additional outlay. Since these classes of test subjects only represent program structures, it is absolutely necessary to derive objects from them for their test. They are then tested in that corresponding methods at the objects are called in and executed. The parameters of a method call together with the values of the data components of an object to be called then represent the test data.

The technique of object-oriented programming is comparatively young. There is therefore no technical method for testing classes of object-oriented software. If a programmer wished to test a class in a traditional way, then he would first have to generate a test case, i.e. write a program that instances an object from a class. Further, he would have to work method calls, including parameter values for this object, into this program in the front-end of the test, these having to be matched as exactly as possible to the errors that he hopes to find. Subsequently, he would have to translate and link this program. An evaluation would then ensue after the test run. If the test does not allow any statements about the functionability of this class, he would have to repeat the entire procedure.

SUMMARY OF THE INVENTION

The object underlying the invention is comprised in specifying an interactive method for testing at least one class of an object-oriented program on a computer.

This object is achieved according to the inventive method for testing at least one class of an object oriented program on a computer. Method information about at least one method of the class and the call parameters belonging thereto is acquired from at least one class specification. A test frame is generated using the method information. This test frame enabling objects to be dynamically created and/or statically containing objects, as well as enabling the methods thereof is called with the call parameters. A test program is generated that contains a command interpreter as component part. This command interpreter interprets test commands input by a test person and that contains the test frame generated above as a further component part, in that it is merely translated and linked once. The test program is employed for testing the class, in that input test commands are interpreted by the command interpreter contained therein, so that different test scenarios do not require a renewed translation and linking.

Advantageous developments of the present invention are as follows.

The method information of every individual class of classes to be tested in common is acquired at least for all methods exported via an external method interface.

The test frame contains and/or uses a variable memory. The variable memory is accessed via pointers.

The command interpreter uses at least one debugger present on the computer.

At least one internal data component of at least one object derived from a class is read and/or written.

The method information for at least one class having at least one inherited method is acquired from at least one inheriting class.

At least one class derived from a generic class, whereby the method information for at least one method as well is acquired from the generic class.

What is especially advantageous about the recited method is the fact that classes can be tested temporally before and independently of their actual application in object-oriented programs.

What is especially advantageous in the application of the inventive method is the fact that that all of the characteristic quantities critical for the test can already be acquired in the front-end of the test and that the test program need only be translated and linked once.

In order to be able to also test the interaction of a plurality of classes in a meaningful way, it is beneficially provided in the inventive method that the method information of all classes participating in the test be acquired for the method defined in the external method interface of the participating classes.

It is especially advantageous in the inventive method that the method provides a memory allocation for the object initialization or method calls in the front-end.

A beneficial form of memory allocation occurs, for example, via pointers that can then be redefined during the test mode.

It is also beneficial that the inventive method provides an access to object-internal data components since these are normally not accessible to a tester because of the data hidings that are standard on object-oriented programming.

It is also beneficial in the recited method that a debugger is connected, so that errors discovered during the test can be immediately analyzed and localized with the additional assistance of the debugger.

In order to be able to test the function of a class as completely as possible, the inventive method meaningfully also provides an acquisition of the method information for generic and hereditary classes.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 2 shows a program listing as an example.

DESCRIPTION OF THE PREFERRED EMBODIMENTS

Figure 1:
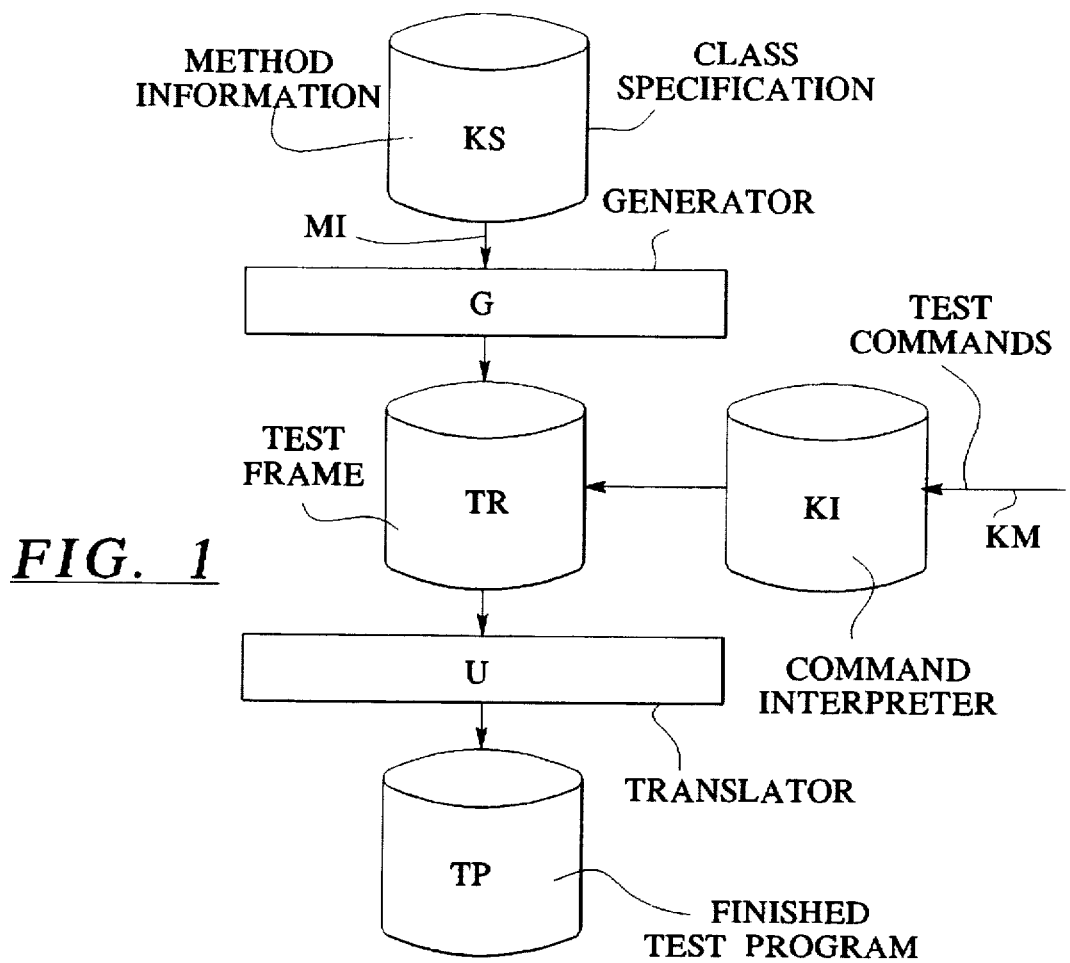
FIG. 1 shows an exemplary embodiment of an inventive method. This exemplary embodiment can, for example, refer to a switching equipment. Let the programming language with which the computer is programmed be, for example, object CHILL.

As shown in FIG. 1, method information MI are acquired, for example, from a class specification KS with the assistance of a generator G and these method information are used for the purpose of offering variable memories for the corresponding parameters of the method calls and the objects of the test subject classes themselves in the form of a test frame TR. Subsequently, the test frame TR together with a command interpreter KI are transmitted with the assistance of a translator U, as a result whereof a finished test program TP arises. This command interpreter KI, for example, is designed for a test command language having test commands KM (the instruction syntax is explained later in the specification under "inputs"). The test end can thus simply produce test scenarios. For example, the command interpreter can allow the following instructions:

```
<statements>      ::= {<command> ";"}.
<command>         ::= <control_cmd> | <general_cmd> |
                      <regtest_cmd> |
                      <output_cmd> | <modclss_cmd> |
                      <assign_cmd>
                      <methcall_cmd>
<control_cmd>     ::= Do WHILE <chars> ";" <statements> OD
                      IF <chars> THEN <statements>
```

-continued

```
                    |ELSE <statements>|FI.
<general_cmd>     ::= DCL <chars> |
                      END |
                      PROTSTATUS |
                      PROTOCOL |TERM| |ALL| |INP| |OUT| |
                      INPUT (INP1 | INP2 | INP3 | INP4 | INP5) |
                      RETURN |
                      EXIT |
                      HELP |<cmd_keyword>|
                      IDS_ON.
<output_cmd>      ::= SAY (<idsvar> | <string>) |
                      WRITE (<idsvar> | <string>).
<regtest_cmd>     ::=REGTESTSTART |
                      REGTESTEND
<modclss-cmd>     ::=DCL_OBJ <objvar> <ident> |<parlist>|.|
                      DCL_REF_OBJ objvar |
                      ASSIGN_REF_OBJ <objvar> <idsvar> |
                      ASSIGN_DEREF_PTR <idsvar> <objvar> |
                      SHOW OBJ <objvar> |
                      OBJ LIST (<ident> | ALL |
                      OBJ REF LIST (<ident>) | ALL) |
                      CLASS LIST.
<assign-cmd>      ::= <idsvar> ":="(methcall_cmd> | <chars>) |
                      <objvar> ":="(<objvar> | <methcall_cmd>).
<methcall_cmd>    ::= <objvar> "." <ident> <parlist>.
<cmd_keyword>     ::=DCL | END | . . . | CLASS_LIST.
<param>  . . .    ::= <objvar> | <idsvar>.
<ident>           ::= <letter> { <letter> | <number> | "—"}.
<idsvar>          ::= "%" {<letter> | <number> | <special>}+.
<objvar>          ::= "&" <letter>
                      {<letter> | <number> |"—"}.
<string>          ::= ""{<arbitrary character of the
                      EBCDIC Code except ">}"".
<chars>           ::= {<arbitrary character of the EBCDIC Code
                      except;>}.
<letter>          ::= "A" |"B"| . . . | "Z".
<number>          ::= "0" |"1"| . . . | "9".
<special>         ::= <Special characters allowed for
                      IDS variable names,
                      including components>.
```

For example, a distinction is made between two types of variables in the inventive method. First, the pure IDS variables (IDS: interactive debugging system) that can be declared and used as usual and, second, objects that are declared to be instances of test subject or parameter classes via the command DCL_OBL.

For example, variable from co-linked modules can be employed for IDS and in Boolean conditions of loops and branchings or on the right side of allocations with IDS. The connection between the objects with IDS declared with DCL_OBJ is produced by IDS pointers, for example from the mode "REF testing class" (to be declared with DCL_REF_OBJ) and the two commands ASSIGN_REF_OBJ and ASSIGN_DEREF_PTR. For example, operators of the test system command language are imaged in IDS-operators.

The following instructions for object processing can, for example, be provided in the inventive method, these being interactively input by the tester and assuring high flexibility in the test. The test inputs by the tester and the calls he actuates are meaningfully separately administered. For example, an object administration is provided in order to assure the allocation of pressed objects in the command language to computer objects. Further, a call editing can also be advantageously provided, this assuring the consistency of test method calls with programs sequencing at the hardware side. It is not required to regenerate the test program for this purpose.

COMMANDS FOR OBJECT PROCESSING

Declaration of an Object of a MODULE Class
DCL OBJ Subject Name Class Name "("Parameter List")".

An object on the level of the command language is offered with this command. The parameter list indicates the parameters for the constructor call. It can be omitted; the standard constructor is then called. Otherwise, the same rules as in the method call are valid for them. The object name must be composed of the character & followed by an uppercase letter and then at most an additional 29 uppercase letters, numbers or underlinings; otherwise, the error message "ILLEGAL OBJECT NAME" is output. The class must have been taken into consideration in the generation of the test frame; otherwise, the error message "UNKNOWN CLASS" is output. In case an object having the indicated name was already declared, the error message "OBJECT ALREADY DECLARED" is output. The command name DCL__OBJ was selected for discrimination from the IDS-Command DCL.

Declaration of a Pointer to Objects
DCL__REF__OBJ Pointer Name REF Class Name The declared pointer is an IDS-Variable of whose existence the object administration has knowledge. The rules of IDS are to be observed.

The pointer mode two classes of which objects can be declared is internally declared in the test system. When deleting objects with the DISPOSE__OBJ__Command, a check is made to see whether pointers declared with DCL__REF__OBJ for the class of the object to be deleted also point thereto (see DISPOSE__OBJ__Command).

Deleting an Object of a MODULE Class
DISPOSE OBJ Object Name

An object previously instanced with DCL__OBJ is in turn disposed of with this command. The object must have been previously generated; otherwise, there is an error that is reported with "OBJECT UNDEFINED". In case pointers declared with DCL__REF__OBJ for the class of the object to be disposed of also point to the object, the command is not executed and the error message "OBJECT YET REFERENCED BY POINTER" is output. However, a check is not carried out to see whether other pointers to the object and those declared with DCL__REF__OBJ also exist.

Assignment of the Address of an Object
ASSIGN__REF__OBJ Object Name IDS-Variable The command writes the address of the indicated object into the IDS-Variable. This must have been declared with DCL__REF__OBJ as pointer to the class of the indicated object; otherwise, the error message "UNKNOWN IDS-POINTER" is output. (No polymorphism for the pointers with DCL__REF__OBJ!) The object must have been previously generated with DCL__OBJ, otherwise the error message "UNKNOWN OBJECT" is output.

After the command, the IDS-Variable points to the object. The connection between IDS and the objects of the command language is produced for the tester by this command

Assignment of the Data of a Dereferenced Pointer
ASSIGN__DEREF__PRT IDS-Variable Object Name The command copies the data of the object to which the pointer points into the indicated object. As a result of this command, the connection between IDS and the objects of the command language is produced for the tester.

The IDS-Variable must have been declared with DCL__REF__OBJ as pointer to the class of the indicated object; otherwise, the error message "UNKNOWN IDS-POINTER" is output. (No polymorphism for those declared with DCL__REF__OBJ!) The IDS variable must also in fact indicate an object of this class. This cannot be checked by the testing system! The indicated object must have been previously generated with DCL__OBJ; otherwise, the error message "UNKNOWN OBJECT" is output.

Output of the Data of an Object
SHOW OBJ Object Name

The command initiates the output of the data attributes of the indicated object into the protocol data ALL, OUT and onto terminals if they are activated (with respect thereto, "PROTSTATUS command". It is realized with the IDS command DISPLAY. The object must have been previously generated with DCL OBJ; otherwise, the error message "UNKNOWN OBJECT" is output.

A further possibility of outputting object data is the displaying of dereferenced IDS-Pointers that point to the object with the commands SAY and WRITE.

Call of Ordinary Methods
Object Name. Method Name "("Parameter List")"

Given the indicated object, the method with the parameters of the parameter list is called. it must have teen previously generated with DCL-OBJ. Only IDS-Variables or objects (that were previously declared in the command language) are allowed as parameters. Given faulty modes, the error message "PARAMETER MODES DO NOT FIT TO METHOD NAME" is output. Due to possible overloadings in the methods of the test subject class, the mode error can generally not be more exactly localized. The parameters are to be separated by commas such that exactly one respective comma stands between two parameters that directly follow one another.

Call of a Method with Result
Variable:=Object Name. Method Name "("Parameter List")"

The same rules as in the call of ordinary methods (see above) are valid.

The variable to which the result is assigned must be an IDS-Variable or a mode fitting an object previously declared with DCL__OBJ; otherwise, an error message is output.

Allocation with Objects
Obj1:=Obj2

The corresponding values of Obj2 are allocated to the data components of Obj1. The two objects must have been previously declared DVL__OBJ and must be of the same class; otherwise, the error massage "UNKNOWN OBJECT object name" or, respectively, "MODE MISMATCH" is output.

Information about Objects
OBJ LIST Class Name

This command initiates the output of the names of all objects that are currently declared for the indicated class. Instead of class name, ALL can also be initiated, whereupon the object names for all classes for which an object administration exists are output. When no object administration was generated for the class with the indicated name, the error message "UNKNOWN CLASS" is output.

Information About Object Pointers
OBJ__REF LIST Class Name

This command initiates the output of all pointer names that are currently declared for the indicated class with the command DCL__REF__OBJ. Instead of class names, ALL can also be recited, whereupon all object pointer names declared with DCL REF OBJ are output. When no object administration was generated for the class with the indicated name, the error message "UNKNOWN CLASS" is output.

Information About Classes

CLASSLIST

This command initiates the output of all class names for which an object administration was generated.

The statements made here are to be interpreted only as an example of one embodiment of the inventive method and take the specific naming of object-CHILL into consideration. They can be directly transferred to other object-oriented program languages such as, for example, C++, Eiffel, SIMULA or Smalltalk. Without limitation on the universality, for example, it can also be provided for proving other commands for a test command interpreter. It is especially important that a test program need be translated only once and that the tester is given the possibility with the inventive method of interactively triggering all test functions required for the class tests. Interactive can also mean in this context that he generates test command data files and starts these and provides them with corresponding abort criteria.

FIG. 2 recites a test example of the inventive method as a program listing. It contains the class declaration and the corresponding commands for the test interpreter.

In this example, the generic class STAGENLS is tested via its two versions STAINTLS and STATEXLS.

A data file that has three class specifications member 1), 2) and 3), as shown, as content serves as input for the generator G (the sequence of the members in the data file is of no significance!).

The class STATEXLS imports from a CHILL-Module TEXMODE. The exporting module is not an input for the generator run.

In this example, two object administration classes OMCL001S and OMCL002S and two call processing classes MCCL001S and MCCL002S are generated because only two classes occur from which objects are instanced and methods can be called in, namely STAINTLS and STATEXLS. Given the above-recited sequence of the member data files, the classes . . . 001S belong to STAINTLS and the classes . . . 002S belong to STATEXLS.

Figure 3:
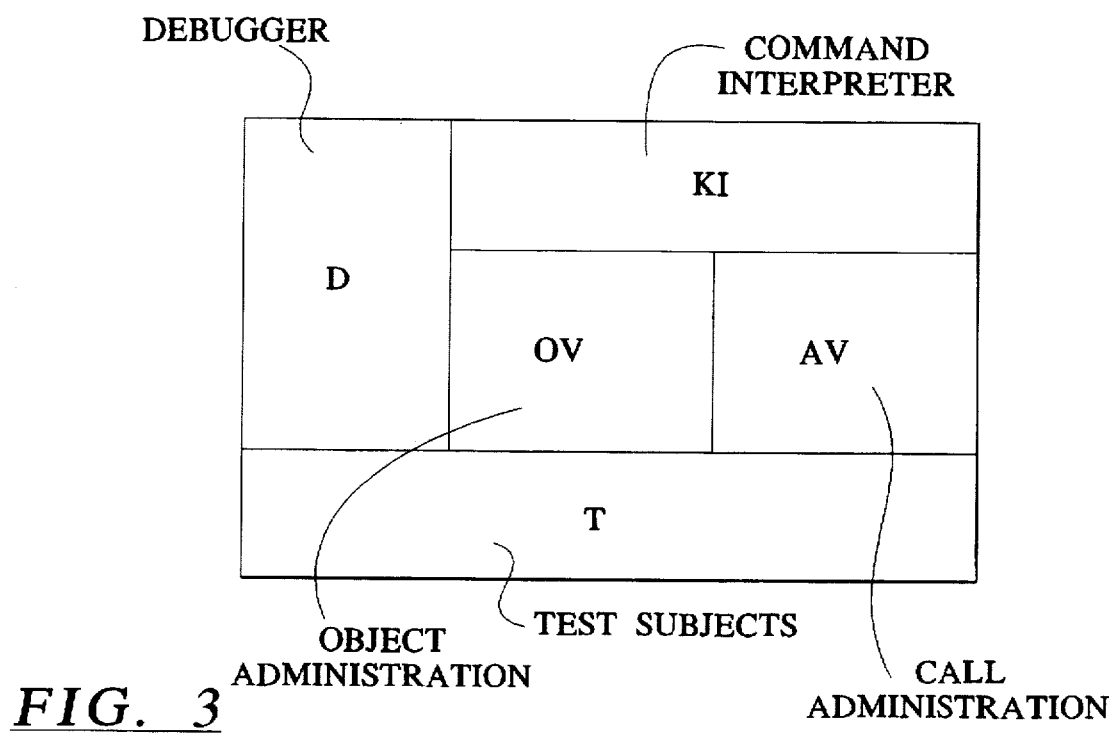
FIG. 3 shows a block diagram of an inventive method.

With reference to a block diagram, FIG. 3 shows the interaction of different components in the implementation of an inventive method fashioned in exemplary fashion.

The command interpreter KI that interprets inputs of a test person is located here at the upper most location. The object administration OV and the call administration AV assure the consistency of test subjects T with the test scenario of a test person. This occurs in that, for example, they allocate memory areas in the computer via pointers or assign names to these memory areas. They thus assure the reliable execution of the method to be implemented.

INPUTS

The Command Language of the Test System
General Conventions

The command language of the test system is based on CHILL and on IDS. In particular, this means that the same character set is employed, i.e. only uppercase letters are allowable for key words and indicators;

all commands are terminated by a semicolon;

comments are treated like blanks;

blanks between key words or indicators must be indicated, whereas they can be omitted between operators.

In addition, the following determinations are made:

Line separators are treated like blanks, i.e. a blank is inserted in a multi-line command after the 80$^{th}$ character (corresponds to one MVS line). A word thus ends no later than at the line end.

The lengths subsequently recited are understood as maximum values.

Indicators are a maximum of 31 characters long. Strings can be one line (80 characters) long when they are output with the commands SAY or, respectively, WRITE. Boolean conditions in loops and branches, expressions and variable declarations dare not exceed 190 characters since these are interpreted or, respectively, declared with the assistance of IDS.

Successfully input commands are not explicitly acknowledged; rather, the input of the next command is anticipated. Exceptions thereto are formed only by the commands END, REGTESTSTART and REGTESTEND.

Faulty commands are indicated by appropriate messages, whereby implicit error corrections are not implemented. After a fault command, the interpreter waits for the next command in the terminal mode, i.e. command data files are left immediately after an error. When the error occurs in control strictures, these are aborted exactly like the command. Further commands in the same line are ignored. Faulty commands during the regression test lead to the abort of the regression test.

About the Description of the Command Language

The description of the commands is based on the expanded Backus-Naur Form (EBNF); the following rules are thereby valid:

Key words of the command language are written with uppercase letters.

Alternatives are represented by 'l', for example: Com has the following form: FORM1 | FORM2, i.e. the command Com can be input in the form FORM1 or FORM2.

Parts that can be omitted are bracketed in '[' and ']'. For example: Com has the following form: TEIL1 [TEIL2], i.e. the command Com can be represented in the form TEIL1 or TEIL1 TEIL2.

Parts that belong together are bracketed in '(' and ')'. For example: Com has the following form: (TEIL1 | TEIL2) TEIL3, i.e. the command Com can be represented in the form TEIL1 TEIL3 or TEIL2 TEIL3.

Given commands or command parameters that can be abbreviated, the abbreviation is the underlined part of the name. For example, K<u>URZ</u>FORM can be abbreviated by KURF.

Overview of the Syntax

The syntax of the command language is described in the following chapters with EBNF, just like the individual commands. In addition, the following determinations are made:

Non-terminal symbols that serve the purpose of being able to classify the grammar in structured form are between pointed brackets ('<' and '>').

Terminal symbols are symbols that belong to the TeS command language. The key words are written in capitals and other symbols are enclosed in quotation marks (for example (":=").

The non-terminal symbols standing to the left of the meta character '::=' can be replaced by the right side. The grammar is context-free, i.e. no additional terminal symbols reside at the left side.

Symbols that are allowed to be repeated arbitrarily often (even 0 times) are bracketed in '{' and '}'. When a '+' follows the closing bracket, then this means that the symbol must be repeated at least once. When a number x follows, then the bracket part must be repeated exactly x-times.

The meta symbol '.' indicates the end of a rule.

Instead of the non-terminal symbol <chars>, an arbitrary character sequence is expected that is forwarded for evaluation to IDS. This character sequence is not syntatically analyzed by the test system.

Grammar of the Command Language for the MODULE Class Test

| | |
|---|---|
| <statements> | ::= {<command> ";"}. |
| <command> | ::= <control_cmd> | <general_cmd> | <regtest_cmd> | <output_cmd> | <modclss_cmd> | <assign_cmd> | <methcall_cmd> |
| <control_cmd> | ::= DO WHILE <chars> ";" <statements> OD | IF <chars> THEN <statements> |ELSE <statements>|FI. |
| <general_cmd> | ::= DCL <chars> | END | PROTSTATUS | PROTOCOL [TERM| |ALL| |INP| |OUT| | INPUT (INP1 | INP2 | INP3 | INP4 | INP5) | RETURN | EXIT | HELP [<cmd_keyword>]| IDS_ON. |
| <output_cmd> | ::= SAY (<idsvar> | <string>) | WRITE (<idsvar> | <string>). |
| <regtest_cmd> | ::= REGTESTSTART | REGTESTEND. |
| <modclss_cmd> | ::= DCL__OBJ <objvar> <ident> [<parlist>] | DCL__REF__OBJ <idsvar> REF <ident> | DISPOSE__OBJ <objvar> | ASSIGN__REF__OBJ <objvar> <idsvar> | ASSIGN__DEREF__PTR <idsvar> <objvar> | SHOW__OBJ <objvar> | OBJ__LIST (<ident> | ALL) | OBJ__RE__LIST (<ident> | ALL) | CLASS__LIST. |
| <assign_cmd> | ::= <idsvar> ":=" (<methcall_cmd> | <chars>) | <objvar> ":=" (<objvar> | <methcall_cmd>). |
| <methcall_cmd> | ::= <objvar>"."<ident> <parlist>. |
| <cmd_keyword> | ::= DCL | END | ... | CLASS__LIST. |
| <parlist> | ::= "(["<param>{","<param>}]")". |
| <param> | ::= <objvar> | <idsvar>. |

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for testing at least one class of an object oriented program on a computer, comprising the steps of:

acquiring method information, about at least one method of a class and call parameters belonging thereto, from at least one class specification;

generating a test frame using the method information, said test frame enabling objects to be dynamically created and/or statically containing objects, as well as enabling methods thereof, to be called with the call parameters;

generating a test program that contains a command interpreter as a component part, said command interpreter interpreting test commands input by a test person and that contains the test frame generated in the previous step as a further component part, in that the test program is merely translated and linked once;

using the test program for testing the class, in that input test commands are interpreted by the command interpreter contained therein, so that different test scenarios do not require a renewed translation and linking.

2. The method according to claim 1, wherein the method information of every individual class of classes to be tested in common is acquired at least for all methods exported via an external method interface.

3. The method according to claim 1, wherein the test frame contains and/or uses a variable memory.

4. The method according to claim 3, wherein the variable memory is accessed via pointers.

5. The method according to claim 1, wherein the command interpreter uses at least one debugger present on the computer.

6. The method according to claim 1, wherein at least one internal data component of at least one object derived from a class is read and/or written.

7. The method according to claim 1, wherein the method information for at least one class having at least one inherited method is acquired from at least one inheriting class.

8. The method according to claim 1, wherein for at least one class derived rom a generic class, the method information for at least one method as well is acquired from the generic class.

* * * * *